Patented Jan. 3, 1933

1,893,313

UNITED STATES PATENT OFFICE

PAUL G. WILLETTS, OF WEST HARTFORD, CONNECTICUT, ASSIGNOR TO HARTFORD-EMPIRE COMPANY, OF HARTFORD, CONNECTICUT, A CORPORATION OF DELAWARE

REFRACTORY

No Drawing.    Application filed July 21, 1928.  Serial No. 294,601.

This invention relates to fire bricks and other refractory articles for use at high temperatures.

The value of fire bricks is determined by their resistance to shrinkage under continuous heating and by their resistance to spalling, slagging and deformation under load. I have discovered that refractory bricks, tiles and the like, having superior properties in these respects, may be produced at low cost from white bauxite, Georgia Klondike white kaolin and a hard bauxitic fireclay known as Georgia $G^1$ clay, by the process described below. The Georgia $G^1$ clay is the hard clay from Gordon, Wilkinson County, Georgia, referred to on page 15 of Bulletin 252 of the U. S. Dept. of Commerce, Bureau of Mines.

The chemical compositions of these three starting materials are indicated in the following table, which gives analyses of typical samples:

|  | White bauxite | Georgia Klondike white kaolin | Georgia $G^1$ clay |
|---|---|---|---|
| Loss on ignition | 24.20 | 13.75 | 15.63 |
| $Al_2O_3$ | 50.82 | 39.19 | 36.59 |
| $SiO_2$ | 22.71 | 45.24 | 44.75 |
| $TiO_2$ | 2.45 | 1.61 | 1.56 |
| $Fe_2O_3$ | 0.53 | 0.43 | 1.22 |
| CaO | 0.18 | Trace | 0.42 |
| MgO | 0.01 | None | 0.17 |
| $Na_2O$ | 0.10 | 0.60 | 0.10 |
|  | 101.00 | 100.82 | 100.44 |

It will be noted that all three of these materials are low in fluxes, particularly in iron and alkalies.

I have also discovered that, in commercial practice, the most desirable balance of properties may be obtained in fire bricks if the bricks have an alumina-silica ratio of about 56 parts of alumina to about 40 parts of silica. This proportion of alumina and silica produces a product which is more rigid and has less constant shrinkage than bricks having a higher content of alumina, and such bricks also have a greater load capacity than bricks higher in alumina. It has long been recognized in the art that bauxite and bauxitic clays theoretically should product refractory bodies of great value. It has been known that bauxite, for example, containing, as it does, a highly desirable proportion of alumina and silica and a relatively low flux content, will theoretically by itself form a superior refractory body, if calcined to a point at which its characteristic constant shrinkage may be eliminated and the body stabilized. This, however, cannot be done ceramically at commercially obtainable temperatures.

In the past, the refractoriness of bauxite and bauxitic clays has been recognized by nearly every manufacturer of refractories, and it seems safe to say that at some time, substantially all of these manufacturers, and their ceramists, have attempted to form a superior refractory body by the use of bauxite and bauxitic clays. But while refractory bricks have from time to time appeared on the market formed from bauxite, there are at the present time few successful ones on the market. The reasons for this commercial failure of bauxite bricks are stated in part by Searle, "Refractory Materials, Their Manufacture and Uses", 1924, Charles Griffin & Co., Ltd., page 409, as follows:

*Shrinkage.*—The chief drawback of bricks containing a large proportion of bauxite is their continual shrinkage when in use at high temperatures. Even when bauxite bricks have been burned at the highest temperature attainable in a kiln, they still continue to shrink when in use, and it has hitherto been found almost impossible to produce bauxite bricks of perfectly constant volume. If the temperature at which the bricks were burned during manufacture is below that corresponding to Seger cone 10, the shrinkage of the bricks in use may be serious; with a higher burning temperature the shrinkage in use will be less, but it will still be noticeable. Finer particles of bauxite are more constant in volume on repeated heating than are the coarser ones.

The shrinkage of bauxite can be reduced by the addition of quartz, but this lowers the refractoriness of the bauxite and so produces bricks which are little, if any, better than those made of fireclay. Hence, the addition of silica to bauxite is not to be recommended.

Cracking is by no means uncommon among bauxite bricks, and is usually a result of the bauxite not having been burned sufficiently before use.

Furthermore, all prior attempts to make bauxite bricks known to me have followed old ceramic practices of using the materials either raw or calcined in grains not materially smaller than 8-mesh, and the burning of these materials has never exceeded cone 18 (see Searle page 409). Because of the system used in the prior art, the bricks, or other objects, after having been fired, still contain bauxite as such, and continue to exhibit the characteristic bauxite tendency of constant shrinkage, even at temperatures lower than the firing temperature. Thus it is evident that before such a mixture could possibly be stabilized, it would have to be raised to a temperature at which bauxite, per se, would be stabilized and this, as pointed out above, is commercially impossible.

My invention comprises, as far as I am aware, the first successful production of a super-refractory in which the refractory character of bauxite and bauxitic clays is used in a composition which, when burned at commercially obtainable temperatures, namely 2800° to 2900° F. will result in a stable body in which the constant shrinkage due to the bauxite is not present, and which blocks have superior resistance to spalling, cracking, etc.

Contrary to the prior practices, I so distribute the eutectic-lowering effect of the fluxes in the mixture as to completely convert all of the alumina contained in the bauxite or bauxitic clay into mullite at commercially possible temperatures, and simultaneously form a glassy matrix having a high point of fusion and in this manner, I am enabled to employ materials having unusually low iron and alkali metal oxide contents. Thus, during the process, I destroy the identity of the starting materials and produce a homogeneous mass by effecting chemical reactions and combinations which cannot take place without this destruction. The end product which I obtain differs from any prior product formed from bauxite or bauxitic clays in that it contains but two phases, namely, mullite crystals and a glassy matrix, while all previous bricks made from these materials have resulted in at least three-phase end products. The fusion point and the porosity are sufficiently high for all practical purposes in bricks having this ratio of silica to alumina.

A very desirable refractory, known as "No. 10", may be made by mixing the three starting materials in the proportions of about 55% of white bauxite, about 35% of Georgia Klondike white kaolin, and about 10% of Georgia $G^1$ clay. These proportions may be varied within one or two per cent. above or below the percentages stated. For example, a very satisfactory batch may be made up of

| | Parts by weight |
|---|---|
| Raw white bauxite | 128 |
| Raw Georgia Klondike white kaolin | 87 |
| Raw Georgia $G^1$ clay | 21 |

These ingredients are ground to extreme fineness, suitably such as to pass through a standard U. S. No. 325 screen, and are intimately mixed in the presence of water, by blunging, repeated pugging or other suitable methods, to produce intimate association of the three ingredients. The mixed material is then formed into pieces suitable for handling, which are calcined at a temperature of about 2850° F. or higher, and the calcined product is then broken down to form grog, this grog being suitably made fine enough to pass through a standard U. S. No. 8 screen.

About 60 parts of the grog thus prepared is mixed with about 40 parts of the above-described raw mixture, which may itself be mixed either wet or dry and the assembled material is dry-pressed under moderate pressure, of the order of two tons per square inch, to form the desired bricks or other shapes. The material, when pressed, should contain about 8% of water. The pressed bricks or other shapes are then dried and fired at a temperature of 2850° F. or higher.

The white bauxite, while highly refractory, has a high, continuous and ever-present shrinkage at high temperatures, does not become impermeable until about 3250° F. and is substantially non-plastic, so that it has only slight mechanical strength. The Klondike clay is a soft white and non-plastic kaolin. It offsets the shrinkage of the bauxite in bricks which are fired at about 2850° F. and performs the further functions of adding to the silica content of the product and producing rigidity under high temperatures. This kaolin alone does not become impermeable below 2800° F., has a softening point of cone 34, and has only slight mechanical strength when raw (modulus of rupture only 15 lbs. per sq. in.). The $G^1$ bauxitic clay has a considerable degree of plasticity and performs the functions in this mixture of still further adding to the silica content and producing rigidity under heat, but is primarily used to give the initial mixture sufficient temporary strength for molding and handling. The $G^1$ clay also contributes to the final mechanical strength of the product. It too has a fusion point of cone 34 and is extremely resistant to spalling.

The pressure under which the final assembly is dry-pressed is somewhat critical and for best results should be from 1 ton to 2½ tons per square inch, preferably about 2 tons. Higher pressure, of the order of 5 tons per square inch, for example, gives a denser product and one having a greater load-carrying capacity, but such a product is less resistant to spalling on account of its greater density.

The properties of the bricks produced by this specific process are indicated in the following table, which also gives the corresponding properties of an ordinary commercial firebrick of the highest grade, and of a highly aluminous commercial firebrick.

|  | No. 10 brick | Highest grade ordinary firebrick | Highly aluminous firebrick |
|---|---|---|---|
| True density | 2.94 | 2.70 | 3.221 |
| Bulk density | 2.113 | 2.142 | 2.186 |
| Porosity | 27.1% | 19.0% | 31.4% |
| P. C. E. | Cone 36 | Cone 32-33 | Cone 36 |
| Fusion point | 3290° F. | 3132° F. | 3290° F. |
| Load test (25 lbs. per sq. in. for one hr. at 2786° F.) | 3% compression | 13.8% compression | 6.5% compression |
| Load test (50 lbs. per sq. in.) | 5.1% compression at 2876° F. |  |  |
| Mellon Institute standard spalling test | No spalling | 4.8% | 19.4% |
| Mellon Institute standard slagging tests: |  |  |  |
| Not attacked | 87.9% | 85.9% | 84.3% |
| Eroded | 5.8% | 12.1% | 3.1% |
| Slagged | 6.3% | 1.0% | 12.6% |

It is evident from these properties and test results that these bricks have extraordinary ability to withstand the most severe conditions of service, and this has been shown also by actual use in furnaces, in which these bricks have withstood temperatures as high as 3200° F. or 3300° F., repeated heating and cooling, and severe mechanical shocks, for long periods of time and with less than 1% shrinkage.

Microscopic examination of this product shows that it is composed of two constituents or phases only, a crystalline constituent having the optical properties of mullite ($3Al_2O_3.2SiO_2$) and a glassy constituent. The crystalline constituent occurs in very minute crystals, the average size of which is 0.004 mm. × 0.001 mm. Occasionally larger crystals are seen, the maximum size being about 0.015 mm. × 0.002 mm. The crystals are very uniform in size and uniformly distributed through the mass. They show parallel extinction, positive elongation and an average index of refraction of about 1.65. This index indicates that the crystals are nearly pure mullite in composition and contain very little $Fe_2O_3$ or $TiO_2$ in solid solution. Therefore these oxides, and the bases shown by analysis, appear to be all in the glass.

Another desirable product of the same general type, known as "No. 9" may be made by mixing the same three starting materials in about the proportions of 80% white bauxite, 10% Georgia Klondike white kaolin and 10% Georgia G¹ clay. For example, the batch may contain

| | Parts by weight |
|---|---|
| Raw white bauxite | 174 |
| Raw Georgia Klondike white kaolin | 21 |
| Raw Georgia G¹ clay | 21 |

This mixture is formed into grog, assembled with additional raw binder, dry-pressed and fired in the manner described above in connection with the first example. The resulting product is slightly more porous than the product first described. It withstands the load, spalling and slagging tests nearly as well as the "No. 10" material.

The chemical compositions of the two products selected for illustration are shown in the following table:

|  | No. 9 | No. 10 |
|---|---|---|
| Loss on ignition | .22 | .28 |
| $SiO_2$ | 34.89 | 39.90 |
| $Al_2O_3$ | 61.39 | 56.38 |
| $Fe_2O_3$ | 1.11 | .89 |
| $TiO_2$ | 2.72 | 2.65 |
| CaO | .28 | .28 |
| MgO | .27 | .25 |
| $Na_2O$ | None | .06 |
|  | 100.88 | 100.69 |

It is particularly to be noted that these products contain only small amounts of iron and alkali metal oxids, which, I have found, have a substantial influence upon the refractoriness of clay products and upon their effective life. I attribute the superior properties of these products partly to this low content of iron and alkali, and partly to the advantageous internal structure produced by the fine grinding and the intimate associate of the ingredients and by the degree of pressure employed in pressing the final assembly.

*Calculated composition "No. 9" and "No. 10" batch mixtures (dry basis)*

|  | No. 10 | No. 9 |
|---|---|---|
| $Al_2O_3$ | 56.00 | 61.50 |
| $SiO_2$ | 40.40 | 34.60 |
| $TiO_2$ | 2.53 | 2.90 |
| $Fe_2O_3$ | .68 | .74 |
| CaO | .16 | .23 |
| MgO | .02 | .02 |
| $Na_2O$ | .33 | .19 |
| Totals | 100.12 | 100.18 |
| Total $Al_2O_3+SiO_2$ | 96.4% | 96.1% |
| Total $Fe_2O_3+Na_2O$ | 1.01% | .93% |
| Balance | 2.71% | 3.15% |

Thus the formulation of the raw batch may be so controlled as to contain a minimum of approximately 96% total alumina and silica, of which preferably 56% or more is alumina, a minimum total of approximately 1% iron and alkali metal oxides, and the balance, (approximately 3%) such impurities as titanium and alkaline earth metal oxides. Consequently, control of end product compositions is made possible within similar limits, even though they are subject to some slight variations as the result of the handling and firing of the batch material, as shown by the above typical end product compositions.

The use of the Georgia Klondike kaolin is especially important in regulating the composition as aforesaid because the amount of bauxite used is fixed between relatively narrow limits by the desired alumina content, and the amount of plastic clay introduced into the batch is restricted by its relative high content of certain impurities, although its use is highly advantageous in other respects.

The extent of chemical control afforded by the batch composition of the invention is particularly significant in view of the fact that it is unusually refractory, and when treated substantially as above described, will mature at a relatively low temperature such as 2850° F.; that is, at such temperature, after-shrinkage, discussed above, completely is eliminated. That is advantageous as a practical matter because especially designed and constructed kilns need not be employed in firing the end products; such a maturing temperature may readily be obtained in practice and readily controlled.

In the appended claims, the starting materials are, for convenience, referred to specifically as white bauxite, Georgia Klondike white kaolin and Georgia G¹ clay. It will be understood that these designations include all bauxites and clays having approximately the analytical compositions stated above for these particular materials, and that my invention includes the use of such equivalent bauxites and clays, or mixtures of other clays having the approximate analytical compositions and properties of the specific mixtures described above.

I claim as my invention:

1. A batch mixture for a ceramic bauxitic refractory comprising unmelted bauxitic mineral having the characteristics of Georgia white bauxite, non-plastic kaolin having the characteristics of Georgia Klondike kaolin, and plastic clay having the characteristics of Georgia G¹ clay, all in a state of impalpable fineness, said mixture having a maturing temperature as low as approximately 2850° F.

2. A batch mixture according to claim 1 wherein the ingredients are present in such proportions, and which contains such a quantity of the bauxitic mineral, that said batch mixture contains approximately 56% or more alumina.

3. A batch mixture for a ceramic bauxitic refractory comprising approximately 55 to 80% bauxitic mineral having the characteristics of Georgia white bauxite, approximately 35 to 10% kaolin having the characteristics of Georgia Klondike kaolin, and approximately 10% plastic clay having the characteristics of Georgia G¹ clay, all in a state of impalpable fineness, said batch mixture having a maturing temperature as low as approximately 2850° F.

4. The process of preparing a batch mixture for ceramic refractories which comprises grinding to impalpable fineness unmelted highly aluminous material consisting principally of aluminum hydrate mineral of the bauxite group, raw plastic bond clay, and raw clay filler, so that substantially all of each of said materials will pass through a screen of the order of a U. S. No. 325 screen and said materials will combine with substantial homogeneity when subsequently fired, preparing a mixture of the said materials containing the unmelted highly aluminous material, a lesser quantity of the raw clay filler to give the material suitable characteristics for subsequent handling, and a still lesser quantity of plastic bond clay, and sufficient aluminous material, to produce a mixture containing in excess of 50% alumina, intimately mixing said assembled materials in the presence of water, pugging the material, and separating the pugged material into pieces suitable for handling and drying.

5. The process of preparing a batch mixture for a ceramic bauxitic refractory which comprises grinding to impalpable fineness bauxitic mineral, and clay having such characteristics that when treated with the mineral as hereinafter stated, the batch mixture will mature at a temperature as low as approximately 2850° F., the mineral and clay being ground to such fineness that substantially all of each of them will pass through a screen of the order of a No. 325 screen and will combine with substantial homogeneity when subsequently fired, assembling said mineral and clay in such proportions as to provide a mixture containing in the dry state a minimum total of 96% alumina and silica of which approximately 56% or more is alumina, a maximum total of approximately 1% iron and alkali metal oxides, and the balance such impurities as titanium and alkaline earth metal oxides, which mixture will mature at a temperature as aforesaid, intimately mixing the assembled materials in the presence of water, pugging the mixture, and separating the pugged material into pieces suitable for handling and drying.

6. A batch mixture for a ceramic bauxitic refractory comprising unmelted bauxitic mineral having the characteristics of Georgia white bauxite, non-plastic kaolin having the characteristics of Georgia Klondike kaolin, and plastic clay having the characteristics of Georgia G¹ clay, all in a state of impalpable fineness, said mixture containing a minimum total of approximately 96% alumina and silica of which approximately 56% or more is alumina, a maximum total of approximately 1% iron and alkali metal oxides, and the balance such impurities as titanium and alkaline earth metal oxides, which batch mixture has a maturing temperature as low as approximately 2850° F.

7. A batch mixture for a ceramic bauxitic refractory comprising approximately 55 to 80% bauxitic mineral having the characteristics of Georgia white bauxite, approximately 35 to 10% kaolin having the characteristics of Georgia Klondike kaolin, and approximately 10% clay having the characteristics of Georgia G¹ clay, all in a state of impalpable fineness, said mixture containing a minimum total of approximately 96% alumina and silica of which approximately 56% or more is alumina, a maximum total of approximately 1% iron and alkali metal oxides, and the balance such impurities as titanium and alkaline earth metal oxides, which batch mixture has a maturing temperature as low as approximately 2850° F.

Signed at Hartford, Connecticut, this 20th day of July, 1928.

PAUL G. WILLETTS.

CERTIFICATE OF CORRECTION

Patent No. 1,893,313.  January 3, 1933.

PAUL G. WILLETTS.

It is hereby certified that error appears in the printed specification of the above numbered patent requiring correction as follows: Page 3, after line 98, insert the following paragraphs:

"With further regard to the compositions of the end products, it is characteristic of the invention that exceptional control of such compositions within certain limits is afforded by the use of ingredients having the characteristics of those which have been mentioned, especially when employed in the proportions given above.

That is shown by the following data on the calculated chemical compositions of the batch mixtures for the "No. 10" and "No. 9" refractories, derived from the above percentage compositions of said mixtures, and the foregoing typical analyses of the separate ingredients, and reduced to dry basis:"

And that the said Letters Patent should be read with this correction therein that the same may conform to the record of the case in the Patent Office.

Signed and sealed this 9th day of May, A. D. 1933.

M. J. Moore.
Acting Commissioner of Patents.

(Seal)